Sept. 13, 1949.                H. PERSSON                2,482,025
                              NUT BREAKING TOOL
                            Filed July 18, 1947
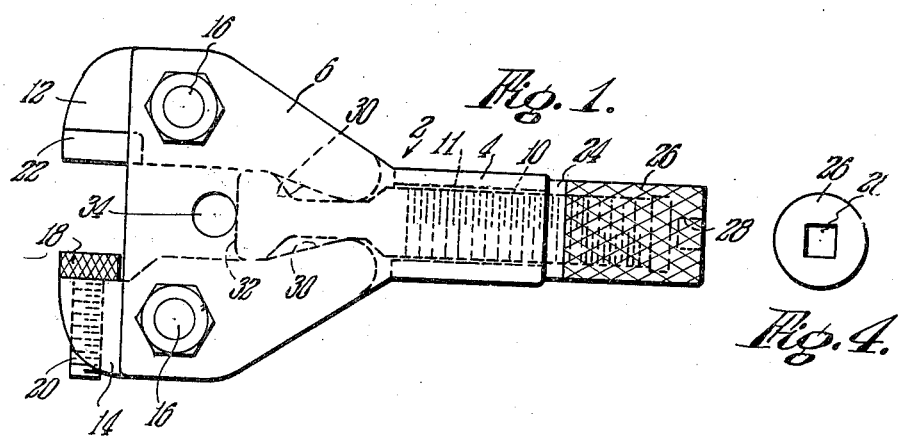
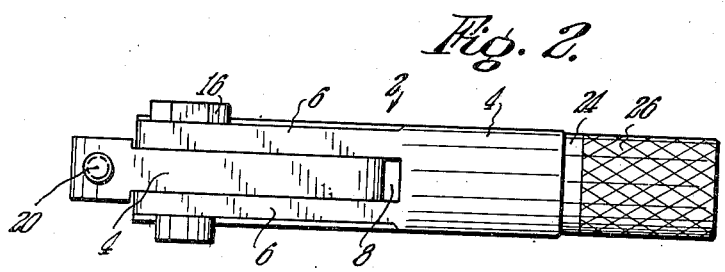
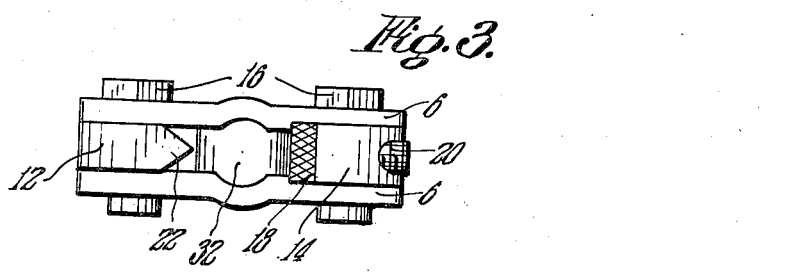
INVENTOR.
Henry Persson Patented Sept. 13, 1949

2,482,025

UNITED STATES PATENT OFFICE 2,482,025

NUT BREAKING TOOL

Henry Persson, Bloomfield, N. J.

Application July 18, 1947, Serial No. 761,933

2 Claims. (Cl. 30—191)

This invention relates to improvements in tools and is directed more particularly to tool devices for splitting or breaking nuts.

The principal object of the invention is the provision of a tool constructed and arranged for splitting the nuts of bolts and studs and the like which for one reason or another cannot be unscrewed therefrom. In many cases the screw or studded nut become particularly corroded or the end of the bolt or stud becomes headed over so that the removal of the nut is impossible, or at least extremely difficult, especially in connection with bolts, studs and nuts of large size.

According to this invention, a tool is provided which is adapted to engage a nut with a splitting or breaking pressure so as to sever the nut in order that it may be removed from a stud or bolt.

With the foregoing and various other novel features and advantages and other objects of my invention as will become more apparent as the description proceeds, the invention consists in certain novel features of construction and in the combination and arrangement of parts as will be hereinafter more particularly pointed out in the claims hereunto annexed and more fully described and referred to in connection with the accompanying drawings wherein:

Fig. 1 is a plan view of a nut breaker embodying the novel features of the invention;

Fig. 2 is a side elevational view of the nut breaker shown in Fig. 1;

Fig. 3 is an elevational view of the forward end of the nut breaker shown in Figs. 1 and 2; and Fig. 4 is an end view of the rear end of the said nut breaker.

Referring now to the drawings more in detail, the invention will be fully described.

A body 2 is provided which has a rear shank portion 4 and upper and lower wings 6 at the forward side thereof which are spaced apart to provide a slot 8 therebetween. A propeller 10 is longitudinally movable in a bore 11 of the shank portion 4.

Jaw members 12 and 14 are pivoted by means of bolts 16 between and to the portions 6. An anvil 18 has a threaded portion 20 in engagement with the outer end of the member 14 and is adjustable in and out so that the upper side of the part 18 may underlie or engage one side of a nut.

The member 12 has a sharpened cutting or splitting edge 22 which is adapted to engage one side of a nut.

A thrust collar 24 is provided and a nut 26 is in threaded engagement with the part 10. Said part 26 may have a socket 28 to receive a wrench or any other suitable means may be provided for turning the member 26.

The members 12 and 14 have rearwardly extending arm portions 30 and the member 10 has an enlarged cam end 32 as shown more clearly in Fig. 1.

The member 10 may be moved rearwardly of the body by rotation of the member 26 and as it moves rearwardly the cam portion 32 engages and spreads the arms 30 outwardly so that the outer or forward end 22 of jaw 12 and the anvil move toward one another.

In use the tool is disposed with reference to a nut so that the anvil 18 engages one side thereof while jaw portion 22 is disposed adjacent the opposite side and then by rotating the member 26 the member 10 is moved rearwardly to spread the jaw members so that the portion 22 of jaw 12 splits or breaks the nut.

The device may be made in various sizes so as to be adapted for breaking nuts of various sizes. The device is strong and rugged and efficient in its operation and is adapted to sever the nut in such a way that it parts so as to be separated from the bolt or stud without injury thereto.

An opening 34 is provided and is adapted to receive a bar or other member which, in the manipulation of the tool in some cases, will be useful for guiding and holding the tool against rotating in case the bolt is loose.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. A nut breaker comprising in combination, a body including a rear shank portion provided with a longitudinal bore and forward wing portions extending forwardly therefrom and spaced apart to form a slot therebetween, jaw members in said slot pivotally connected to the wing portions and having rearwardly extending relatively converging portions, a screw member in said bore having an outer forward cam portion disposed forwardly of the extremities of the rear portions of the jaw members, a nut in engagement with said screw member at the rear inner end of said shank portion adapted on rotation in one direction to bear against said shank and move said screw member rearwardly whereby said jaw members are actuated by said cam portion so that their outer forward ends are moved towards one another, and means carried by the forward outer ends of the jaw members for engaging a nut, said means including an anvil on one said jaw member and a cutting edge provided on said other jaw member.

2. A nut breaker comprising in combination, a body including a rear shank portion provided with a longitudinal bore and forward wing portions extending forwardly therefrom and spaced apart to form a slot therebetween, jaw members in said slot pivotally connected to the wing portions and having rearwardly extending relatively converging portions, a screw member in said bore having an outer forward cam portion disposed forwardly of the extremities of the rear portions of the jaw members, a nut in engagement with said screw member at the rear inner end of said shank portion adapted on rotation in one direction to bear against said shank and move said screw member rearwardly whereby said jaw members are actuated by said cam portion so that their outer forward ends are moved towards one another, and means carried by the forward outer ends of the jaw members for engaging a nut, said means including an anvil on one said jaw member and a cutting edge provided on said other jaw member, said cam portion formed by a portion of said screw member inwardly of its forward end being of less diameter than the main body thereof to provide a relatively larger endmost forward portion.

HENRY PERSSON.

REFERENCES CITED

The following references are of record in the file of this patent:

UNITED STATES PATENTS

| Number | Name | Date |
| --- | --- | --- |
| 451,024 | Chadwick | Apr. 28, 1891 |
| 474,566 | Rittenhouse | May 10, 1892 |
| 1,159,641 | Bernard | Nov. 9, 1915 |